(12) United States Patent
Jung

(10) Patent No.: US 11,667,291 B2
(45) Date of Patent: Jun. 6, 2023

(54) METHOD AND APPARATUS FOR VEHICLE BRAKING

(71) Applicant: HYUNDAI MOBIS CO., LTD., Seoul (KR)

(72) Inventor: Ha Min Jung, Hwaseong-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 118 days.

(21) Appl. No.: 17/332,433

(22) Filed: May 27, 2021

(65) Prior Publication Data

US 2021/0370943 A1  Dec. 2, 2021

(30) Foreign Application Priority Data

Jun. 1, 2020  (KR) .................. 10-2020-0065730

(51) Int. Cl.
| | |
|---|---|
| *B60W 30/18* | (2012.01) |
| *B60T 17/22* | (2006.01) |
| *B60W 10/184* | (2012.01) |
| *B60W 10/20* | (2006.01) |
| *B60T 8/92* | (2006.01) |
| *B62D 6/00* | (2006.01) |
| *B62D 15/02* | (2006.01) |

(52) U.S. Cl.
CPC ......... *B60W 30/18109* (2013.01); *B60T 8/92* (2013.01); *B60T 17/221* (2013.01); *B60W 10/184* (2013.01); *B60W 10/20* (2013.01); *B62D 6/00* (2013.01); *B62D 15/021* (2013.01); *B60T 2240/00* (2013.01); *B60T 2260/02* (2013.01); *B60T 2260/09* (2013.01); *B60T 2270/406* (2013.01); *B60W 2510/20* (2013.01); *B60W 2520/28* (2013.01); *B60W 2710/18* (2013.01); *B60W 2710/202* (2013.01)

(58) Field of Classification Search
CPC .... B60W 30/18; B60W 10/184; B60W 10/20; B60T 17/22; B60T 8/92; B62D 6/00; B62D 15/02
See application file for complete search history.

(56) References Cited

U.S. PATENT DOCUMENTS

2011/0231052 A1* 9/2011 Ellis ...................... B60T 8/17
701/31.4
2018/0273006 A1* 9/2018 Murayama .......... B60T 8/17551

* cited by examiner

*Primary Examiner* — Tan Q Nguyen
(74) *Attorney, Agent, or Firm* — Morgan, Lewis & Bockius LLP

(57) ABSTRACT

At least one embodiment of the present disclosure provides an apparatus for braking a vehicle, including a plurality of electro-mechanical braking (EMB) systems respectively installed for a plurality of vehicle wheels and configured to generate a braking force to the plurality of wheels, respectively, a driving information detecting unit for measuring driving information of the vehicle, an electronic power steering (EPS) system generating a steering torque in a direction opposite to a braking torque generated in the vehicle, and an electronic control unit (ECU) controlling the electro-mechanical braking systems and the electronic power steering system, wherein the electronic control unit is configured to control, upon determining that one or some of the plurality of electro-mechanical braking systems are malfunctioning, the vehicle by using the electronic power steering system, and the electronic power steering system is configured to generate the steering torque according to the driving information including wheel speeds.

9 Claims, 6 Drawing Sheets

| Wheel Speed Reference Value | 1 | 2 | 3 | 4 | 5 | 6 |
|---|---|---|---|---|---|---|
| Braking Torque | 100 | 200 | 300 | 400 | 500 | 600 |
| Steering Torque of EPS | 100 | 200 | 300 | 400 | 500 | 600 |
| Spinning Torque | 0 | 0 | 0 | 0 | 0 | 0 |

*FIG. 6*

METHOD AND APPARATUS FOR VEHICLE BRAKING

CROSS-REFERENCE TO RELATED APPLICATIONS

This application is based on, and claims priority from, Korean Patent Application Number 10-2020-0065730, filed Jun. 1, 2020, the disclosure of which is incorporated by reference herein in its entirety.

TECHNICAL FIELD

The present disclosure in some embodiments relates to an apparatus and a method for vehicle braking.

BACKGROUND

The statements in this section merely provide background information related to the present disclosure and do not necessarily constitute prior art.

A braking apparatus for a vehicle is provided for decelerating or stopping the vehicle as needed in the driving state. The braking apparatus generates braking force by using friction force. Braking apparatuses using hydraulic pressure include a master cylinder, an electronic control unit (ECU), an electronic power steering (EPS) system, and wheel brakes.

A typical braking apparatus can brake a vehicle even if a failure occurs in one wheel brake by using the remaining three wheel brakes. When a vehicle malfunctions at both side wheel brakes, one each side thereof, e.g., one left side wheel brake and its right side wheel brake, the vehicle can be braked without unwanted spinning by using intact wheel brakes.

However, when both wheel brakes on the same left or right side are faulty, the braking performance becomes very vulnerable. For example, when both of the wheel brakes supposed to brake the front-left wheel and the rear-left wheel are down, braking performed with two opposite intact wheel brakes could lead to uncontrolled spinning of the vehicle.

A conventional braking apparatus utilizing a single yaw rate sensor is responsive to when the yaw rate value is determined to be greater than or equal to a reference value, for example, when a braking torque is generated due to the braking of the vehicle causing the vehicle to spin, for controlling the vehicle against spinning by using an electronic power steering system or the like. However, the conventional arrangement using a sensor singly responsible for handling the braking torque caused by braking of the vehicle cannot tackle the issue of spinning torque once the sensor malfunctions, which needs to be resolved for securing redundancy toward braking stability or fail-safe braking.

SUMMARY

According to at least one embodiment, the present disclosure provides an apparatus for braking a vehicle, including a plurality of electro-mechanical braking (EMB) systems, a driving information detecting unit, an electronic power steering (EPS) system, and an electronic control unit (ECU). The plurality of electro-mechanical braking (EMB) systems are respectively installed for a plurality of wheels of the vehicle and configured to generate a braking force to the plurality of wheels, respectively. The driving information detecting unit is configured to measure driving information of the vehicle. The electronic power steering (EPS) system is configured to generate a steering torque in a direction opposite to a braking torque generated in the vehicle. The electronic control unit (ECU) is configured to control the electro-mechanical braking systems and the electronic power steering system. Here, the electronic control unit is configured to control, upon determining that one or some of the plurality of electro-mechanical braking systems are malfunctioning, the vehicle by using the electronic power steering system, and the electronic power steering system is configured to generate the steering torque according to the driving information including wheel speeds.

BRIEF DESCRIPTION OF THE DRAWINGS

FIG. 6 is a table of a tuned value of a steering torque generated by an electronic power steering (EPS) system according to at least one embodiment of the present disclosure.

REFERENCE NUMERALS

Figure 1:
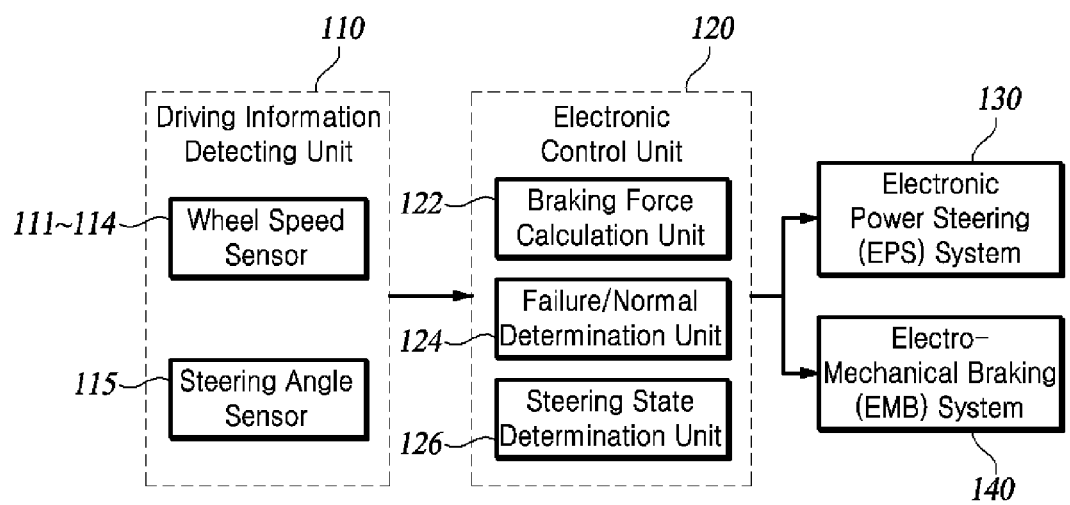
FIG. 1 is a block diagram of a braking apparatus according to at least one embodiment of the present disclosure.

110: driving information detecting unit　　120: electronic control unit
130: electronic power steering (EPS) system
140: electro-mechanical braking (EPB) system
FR, FL, RR, RL: multiple wheels

DETAILED DESCRIPTION

The present disclosure in at least one embodiment seeks to safely brake a vehicle without spinning by using a wheel speed sensor-based electronic power steering (EPS) system even at a concurrent occurrence of failures in both wheel brakes on the same left or right side, e.g., the front-left-wheel brake and the rear-left-wheel brake.

Additionally, the present disclosure in at least one embodiment seeks to counter unnecessary vehicle spinning involved in braking of the vehicle based on multiple wheel speed sensors to tackle the issue of rotational or spinning torque even with malfunctions of some sensors, thereby securing redundancy toward braking stability or fail-safe braking.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a block diagram of a braking apparatus 100 according to at least one embodiment of the present disclosure.

As shown in FIG. 1, the braking apparatus 100 includes all or some of a driving information detecting unit 110, an electronic control unit (ECU) 120, an electronic power steering (EPS) system 130, and at least one or more electromechanical braking (EMB) systems 140.

The driving information detecting unit includes wheel speed sensors 111, 112, 113, 114 and a steering angle sensor 115.

The wheel speed sensors 111, 112, 113, 114 are installed on the wheels for measuring wheel speed information of the vehicle. The measured wheel speed information is transmitted to the electronic control unit 120.

The vehicle is equipped with four wheel speed sensors 111, 112, 113, 114 corresponding to the respective wheels. A conventional brake apparatus has only one yaw rate sensor for use to control a braking torque due to the braking of the vehicle. In contrast, some embodiments of the present disclosure include four wheel speed sensors 111, 112, 113, 114 for use to control the braking torque due to the braking of the vehicle.

Meanwhile, the braking apparatus 100 according to some embodiments allows the electronic control unit 120 that employs the multiple wheel speed sensors to provide a fail-safe control even against a malfunction occurring in any one wheel speed sensor (e.g., 121) over the braking torque due to the braking of the vehicle by deploying other intact wheel speed sensors (e.g., 122, 123, and 124), achieving excellent redundancy toward braking stability or fail-safe braking.

The steering angle sensor 115 detects steering information of the vehicle and transmits the same to the electronic control unit 120. Here, the steering information may include a steering angle and a steering direction. The steering angle sensor 115 is mounted on a lower portion of a steering wheel. The steering angle sensor 115 detects whether the wheel is steered as much as the EPS system 130 steers the wheel.

The electronic control unit 120 includes a braking force calculation unit 122, a failure/normal determination unit 124, and a steering state determination unit 126.

The braking force calculation unit 122 calculates a braking force required to brake the vehicle.

The failure/normal determination unit 124 determines whether a failure occurs in the EMB system 140. To determine whether a failure occurs in the EMB system 140, the failure/normal determination unit 124 uses the wheel speed information measured by the wheel speed sensors 111, 112, 113, and 114. Even when the electronic control unit 120 operates the EMB system 140 to generate the braking force, provided a failure occurs in the EMB system 140, the rotational speed of the wheel does not decrease. Accordingly, the failure/normal determination unit 124 may determine whether the EMB system 140 has a failure by determining whether the rotational speed of the wheel decreases based on the wheel speed information.

The steering state determination unit 126 determines whether the steering angle has reached the target value requested by the electronic control unit 120 when the latter steers the wheels by using the EPS system 130. The steering state determination unit 126 uses steering angle information measured by the steering angle sensor 115 to determine the steering state of the vehicle.

The electronic control unit 120 receives wheel speed information and steering angle information from the wheel speed sensors 111, 112, 113, 114 and the steering angle sensor 115. Then, the electronic control unit 120 transmits the wheel speed information to the EPS system 130. When transmitting wheel speed information, the electronic control unit 120 uses intra-vehicle communication, for example, controller area network (CAN) communications.

The EPS system 130 generates a steering torque for controlling the spin (e.g., spin due to the braking torque) generated in the braking process of the vehicle. Here, the braking torque refers to a torque urging a vehicle to rotate in one direction due to a difference in speed between the respective wheels in the braking process of the vehicle as some of the EMB systems 140 become faulty. Meanwhile, the steering torque is a torque generated by the EPS system 130 and refers to a torque that acts in the opposite direction to the braking torque generated in the braking process of the vehicle against spinning of the vehicle.

In particular, the EPS system 130 operates to control spin due to the braking torque by generating a steering torque in the opposite direction to the spin, thereby nulling the vector sum of the braking torque and the steering torque into zero. When the sum of these vectors reach 0, the vehicle does not spin and can secure straightness.

The EPS system 130 utilizes wheel speed information including the wheel speed measured by the wheel speed sensors 111, 112, 113, 114 to generate a steering torque enough to prevent the vehicle from spinning. The wheel speed information is received from the electronic control unit 120 by using in-vehicle communications, for example, CAN communications.

The EPS system 130 generates a steering torque that is tuned in advance according to the wheel speed information measured by the wheel speed sensors 111, 112, 113, 114. Reference can be made to FIG. 6 for the pre-tuned steering torque. As shown in FIG. 6, as the wheel speed measured by the wheel speed sensors 111, 112, 113, 114 increases, the pre-tuned steering torque also increases. This is because, as the wheel speed increases, the spinning torque generated in the braking process of the vehicle increases, and correspondingly, the required value of the steering torque also increases acting against the braking torque due to the braking.

The EPS system 130 steers the front wheels and/or rear wheels of the vehicle. The EPS system 130 includes both a method of steering only the front wheel(s) and a method of steering not only the front wheel(s) but also the rear wheel(s).

The EMB system 140 is installed corresponding to each of the vehicle wheels. Each EMB system 140 is independently controlled and generates a braking force on each wheel according to the braking request of the electronic control unit 120.

Figure 2:
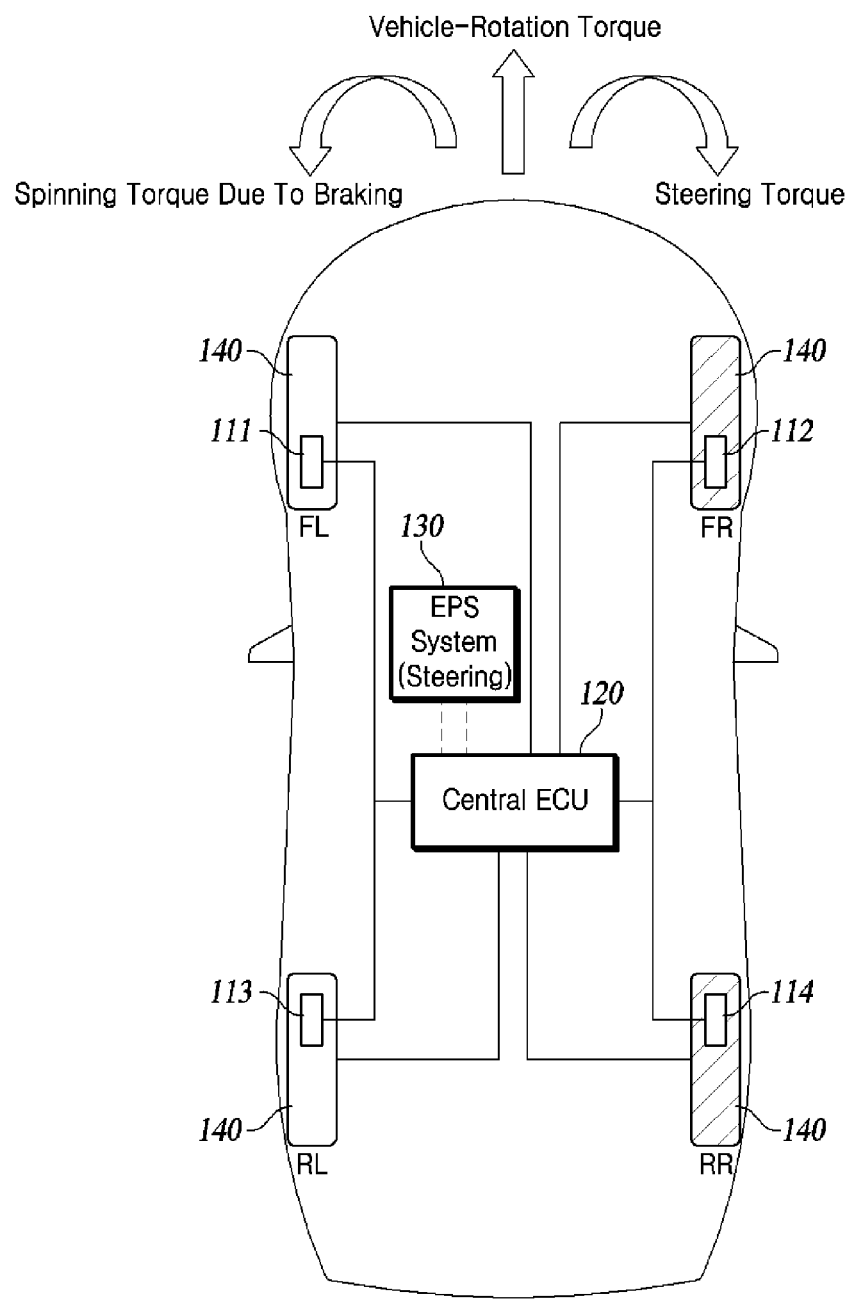
FIG. 2 is a diagram illustrating a concurrent occurrence of failures in an electro-mechanical braking (EMB) system for braking a front-right wheel FR and an EMB system for braking a rear-right wheel RR.

FIG. 2 is a diagram illustrating a concurrent occurrence of failures in an EMB system for braking a front-right wheel FR and an EMB system for braking a rear-right wheel RR.

As shown in FIG. 2, the EMB systems 140 that are hatched indicate malfunctions occurring therein, and the EMB systems 140 that are hatchless indicate their normal operating state.

When both of the EMB system 140 braking right wheels FR and RR of the vehicle are faulty, the vehicle spins leftward during braking. This happens because even if the electronic control unit 120 controls four EMB systems 140 to generate braking force, the right EMB systems 140 braking right wheels FR and RR do not operate in their faulty state, while the left EMB systems 140 are activated to brake left wheels FL and RL only. Accordingly, left wheels FL and RL slow down due to the transmission of the braking force of their EMB systems 140, but the speed of right wheels FR and RR remains the same receiving no transmission of the braking force from the EMB systems 140. Then, the faster rolling right wheels FR and RR relative to left wheels FL and RL make the vehicle spin leftward. In this way, as the vehicle brakes, torque is generated to send the vehicle to spin leftward.

The electronic control unit 120 prevents the vehicle from spinning leftward through the EPS system 130 by generating a steering torque in a direction opposite to the braking torque due to the braking of the vehicle. The electronic control unit 120 transmits the wheel speed information received from the wheel speed sensors 111, 112, 113, 114 to the EPS system 130 by using in-vehicle communications, for example, CAN communications.

The EPS system 130 receiving the transmitted wheel speed information generates a rightward steering torque. Here, the steering torque is the same in magnitude as the braking torque but in the opposite direction thereto.

The magnitude of the braking torque is determined according to the transmitted wheel speed information. For example, as shown in FIG. 6, when the wheel speed reference value of the wheel speed sensors 111, 112, 113, 114 is 1, the magnitude of the braking torque due to the braking is 100 kgf·m. Accordingly, the EPS system 130 generates a steering torque of 100 kgf·m. Here, the wheel speed reference value will be described in detail in FIG. 5.

In the end, when both the EMB systems 140 for braking right wheels FR and RR are faulty, the braking force as generated in the vehicle spins the vehicle leftward, resulting in the leftward braking torque due to the braking. This is arranged to generate the rightward steering torque by the EPS system. Therefore, the concurrence of the braking torque due to the braking of the vehicle and the steering torque applied cancels each other, nullifying the spinning torque acting on the vehicle, and accordingly, the vehicle does not spin and stays straight.

However, when the vehicle still spins even with the EPS system 130 generating the steering torque to control the vehicle spinning, the EPS system 130 needs to generate an additional steering torque.

The electronic control unit 120 determines whether to further generate a steering torque based on the steering angle information measured by the steering angle sensor 115. The determination process is as follows.

The steering sensor 115 measures a steering angle of the vehicle and transmits the same to the electronic control unit 120. The electronic control unit 120 determines whether the received steering angle is within a preset tolerance.

When a comparison of the measured steering angle with the preset tolerance determines that the steering angle measured by the steering angle sensor 115 is within the preset tolerance, for example, even if spinning occurs, when no significant mishap occurs against braking safety, the electronic control unit 120 generate no further steering torque.

On the other hand, when the comparison of the measured steering angle with the preset tolerance determines that the steering angle measured by the steering angle sensor 115 is equal to or greater than the preset tolerance, for example, when the generated steering torque alone cannot control the spinning of the vehicle, the electronic control unit 120 generates an additional steering torque.

When the additional steering torque generated stops the vehicle from spinning anymore and finishes braking thereof, the braking process of the braking apparatus 120 is terminated.

Figure 3:
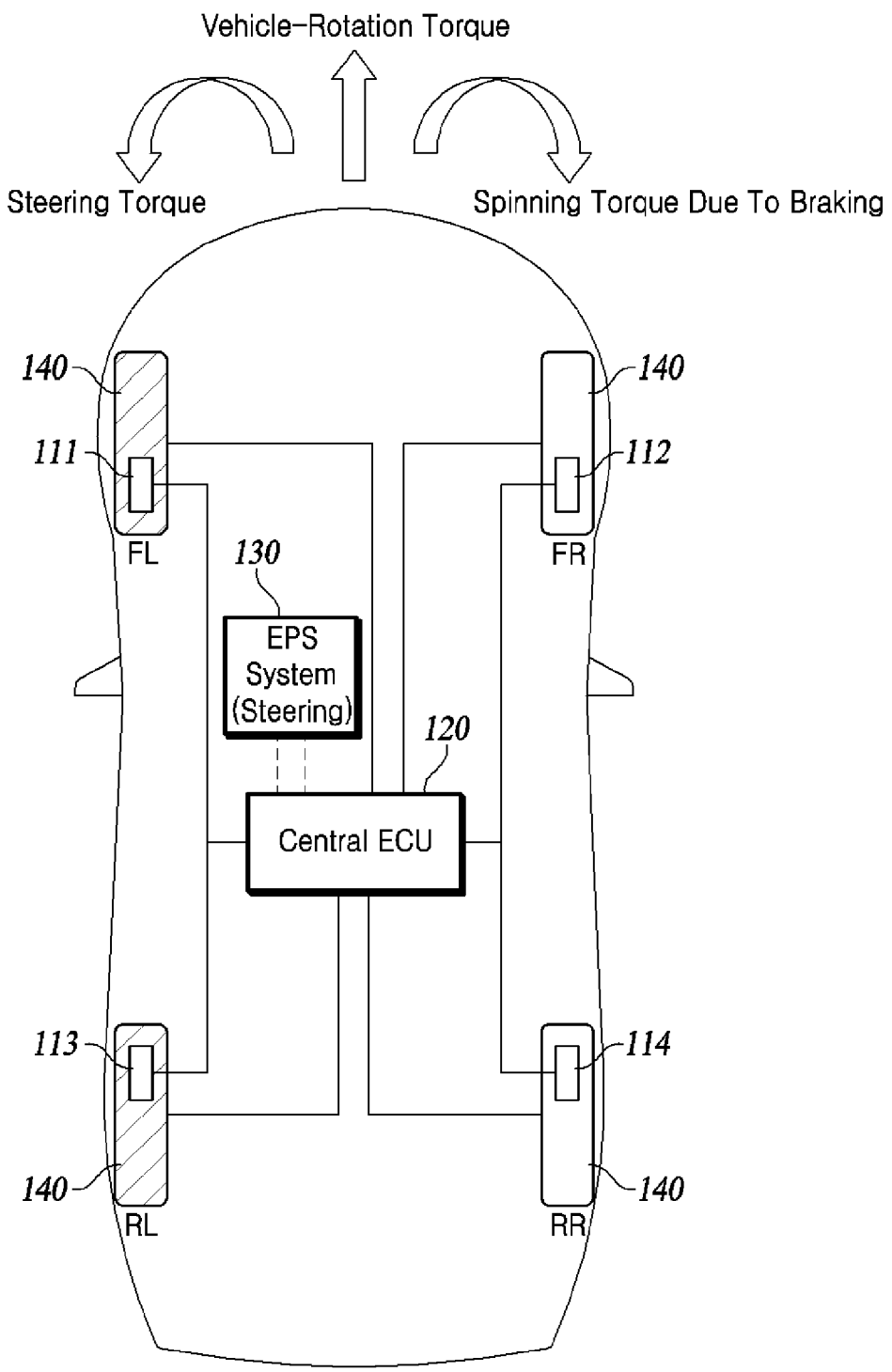
FIG. 3 is a diagram illustrating a concurrent occurrence of failures in an EMB system for braking a front-left wheel FL and an EMB system for braking a rear-left wheel RL.

FIG. 3 is a diagram illustrating a concurrent occurrence of failures in an EMB system for braking front-left wheel FL and an EMB system for braking rear-left wheel RL.

As shown in FIG. 3, the EMB systems 140 that are hatched indicate malfunctions occurring therein, and the EMB systems 140 that are hatchless indicate their normal operating state.

FIG. 3 illustrates an example embodiment with the vehicle spinning opposite to that of FIG. 2. Specifically, FIG. 2 is illustrative of the vehicle spinning leftward, and FIG. 3 shows the vehicle spinning rightward.

In contrast to the case of FIG. 2, FIG. 3 illustrates the malfunctioning EMB systems 140 only with the sides of malfunction switched but others remaining intact, so further description will be omitted.

Figure 4:
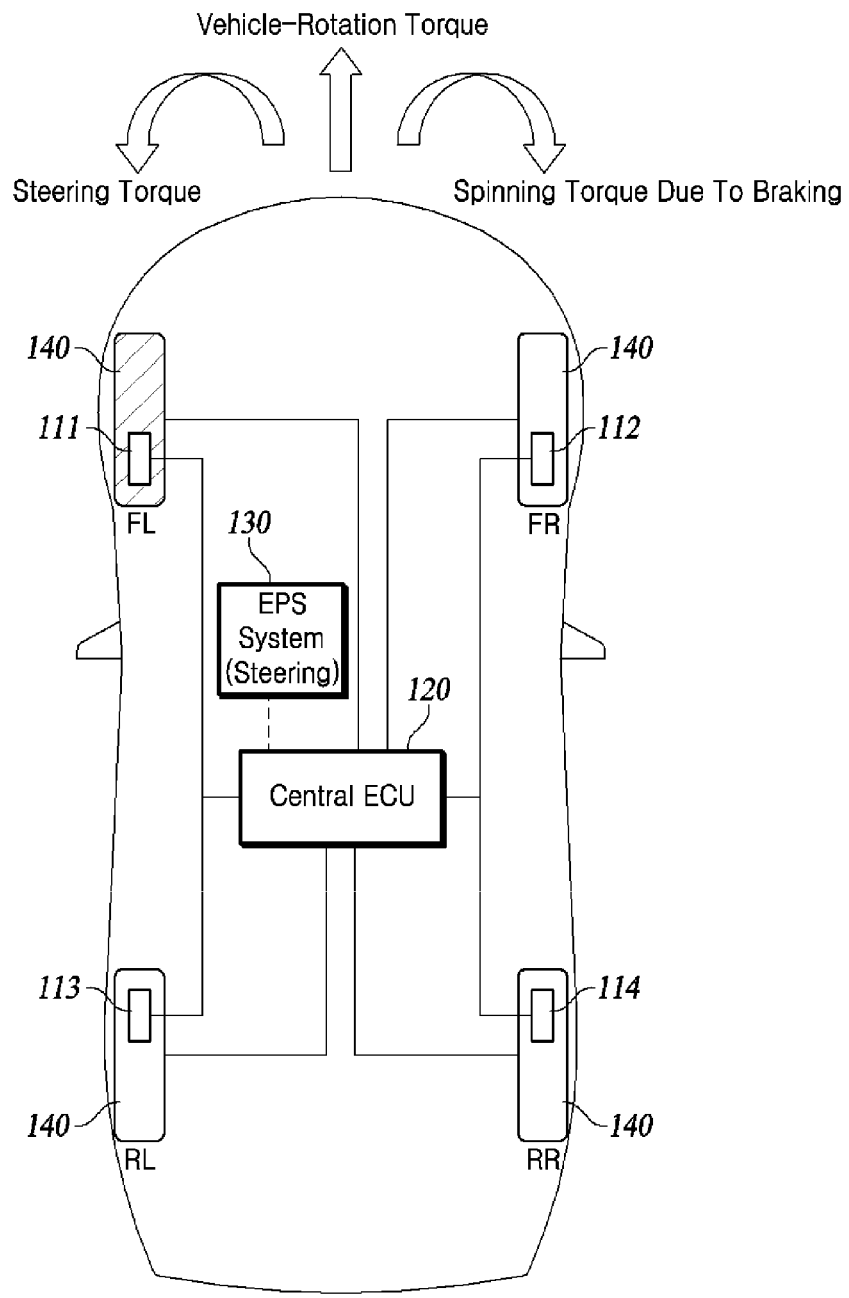
FIG. 4 is a diagram illustrating an occurrence of failure in the EMB system for braking front-left wheel FL.

FIG. 4 is a diagram illustrating an occurrence of failure in the EMB system for braking front-left wheel FL.

As shown in FIG. 4, the EMB system 140 that is hatched indicates a failure occurring therein, and the EMB systems 140 that are unhatched indicate their normal operating state.

When the EMB system 140 for braking front-left wheel FL is faulty, the vehicle spins rightward during braking. The electronic control unit 120 prevents the vehicle from spinning rightward by using the EPS system 130 through generating a steering torque in a direction opposite to the torque due to the braking of the vehicle. Here, the EPS system 130 generates a pre-tuned steering torque according to the wheel speed information.

Figure 5:
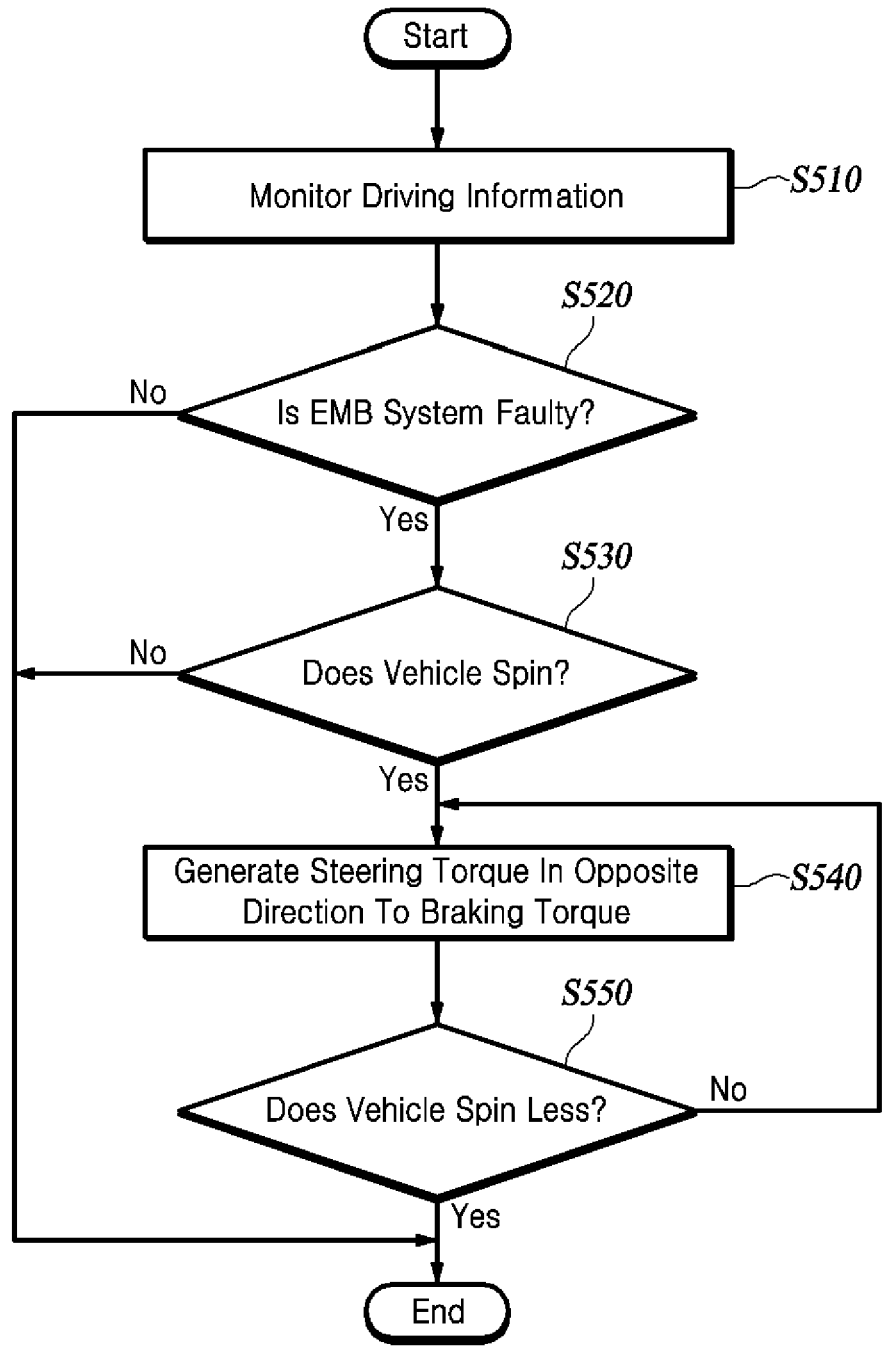
FIG. 5 is a flowchart of a steering control process according to at least one embodiment of the present disclosure.

FIG. 5 is a flowchart of a steering control process according to at least one embodiment of the present disclosure.

As shown in FIG. 5, the driving information detecting unit 110 detects driving information of the vehicle and transmits the same to the electronic control unit 120 (S510). The transmission of the driving information includes, for example, utilizing the wheel speed sensors 111, 112, 113, and 114 to measure the wheel speeds and transmit the same to the electronic control unit 120.

The electronic control unit 120 determines, base on the received driving information, whether the EMB systems 120 are faulty (S520). For example, when the wheel speed does not decrease even after controlling an EMB system 140, the electronic control unit 120 may determine that that EMB system 140 is faulty.

Upon determining that no malfunction is present in the EMB systems 140, the electronic control unit 120 ends the algorithm.

On the other hand, when that the EMB system 140 is determined to be faulty, the electronic control unit 120 determines whether the vehicle spins (S530). For example, upon comparison between wheel speeds and determining that the speed difference is equal to or greater than a predetermined value or determining an abrupt change of the steering angle, the electronic control unit 120 may determine that the vehicle does spin.

Upon determining no vehicle occurs, the electronic control unit 120 ends the algorithm.

Whereas, upon determining that the vehicle spins, for example, when a failure occurs in the EMB systems 140 braking left wheels FL and RL, the EPS system 130 generates a steering torque for controlling the multiple wheels to prevent the vehicle from spinning (S540). The steering torque generated at this time is one previously tuned according to the wheel speed information measured by the wheel speed sensors 111, 112, 113, and 114. Meanwhile, the steering torque generated by the EPS system 130 is in a direction opposite to the braking torque generated due to the braking of the vehicle. Accordingly, the vector sum of the braking torque and the steering torque decreases, which consequently decreases the magnitude of the spinning torque acting on the vehicle to nil.

The electronic control unit 120 determines, by using the steering angle measured by the steering angle sensor, whether the spinning of the vehicle is reduced (S550). For example, the electronic control unit 120 determines whether the measured steering angle is within a preset tolerance (e.g., a set value).

Upon determining that the magnitude of the measured steering angle exceeds the preset tolerance, the electronic control unit 120 controllably enables the EPS systems 130 to further generate a steering torque for preventing spinning of the vehicle. In other words, the electronic control unit 120 returns to Step S540 to generate more steering torque.

On the other hand, upon determining that the magnitude of the measured steering angle is equal to or within the preset tolerance, the electronic control unit 120 ends the algorithm.

FIG. 6 is a table of a tuned value of a steering torque generated by an EPS system according to at least one embodiment of the present disclosure.

For example, the wheel speed reference value of FIG. 6 means a wheel speed tuned in advance. For example, after pre-tuning, wheel speed reference value 1 is 30 km/h, wheel speed reference value 2 is 40 km/h, wheel speed reference value 3 is 50 km/h, and so on.

The braking torque due to the braking in FIG. 6 refers to a torque generated as the electronic control unit 120 brakes the vehicle. For example, when wheel speed reference value is 1 (30 km/h), as the electronic control unit 120 controls the EMB systems 140, a braking torque of 100 kgf·m is generated.

The steering torque of the EPS of FIG. 6 refers to a steering torque tuned in advance. For example, when the wheel speed reference value is 1, the magnitude of the steering torque is tuned to 100 kgf·m, and when the wheel speed reference value is 2, the magnitude of the steering torque is tuned to 200 kgf·m.

The vehicle-rotation torque of FIG. 6 refers to a vector sum of the braking torque and the steering torque. For example, when the wheel speed reference value is 1 (30 km/h), the vector sum of the braking torque and the steering torque is 0.

As shown specifically in FIG. 6, as the wheel speeds measured by the wheel speed sensors 111, 112, 113, 114 increase, the braking torque due to the braking of the vehicle increases. The happens because the greater the wheel speed, the greater the vehicle speed, and the greater the vehicle speed, the greater the difference in wheel speed between the left wheels and the right wheels during braking (when some EMB systems are determined to be faulty). In other words, the increasing difference in wheel speed between the left wheels and the right wheels increases the magnitude of the braking torque applied to the vehicle due to the braking.

Therefore, the EPS system 130 needs to generate a larger steering torque to offset the braking torque caused by braking. Here, the EPS system 130 generates a pre-tuned steering torque to the wheel speed.

As described above, according to at least one embodiment of the present disclosure, an electronic control unit utilizes a wheel speed sensor-based electronic power steering (EPS) system to safely brake a vehicle without spinning even at a concurrent occurrence of failures in both wheel brakes on the same left or right side, e.g., the front-left-wheel brake and the rear-left-wheel brake.

Further, the present disclosure in at least one embodiment can deal with the braking torque caused by braking of the vehicle based on multiple wheel speed sensors rather than using a single responsible sensor for handling the braking torque caused by the vehicle braking, thereby securing redundancy toward the vehicle stability or fail-safe braking even with malfunctions of some sensors.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for braking a vehicle, comprising:
a plurality of electro-mechanical braking (EMB) systems respectively installed for a plurality of wheels of the vehicle and configured to generate a braking force to the plurality of wheels, respectively;
a driving information detecting unit configured to measure driving information of the vehicle;
an electronic power steering (EPS) system configured to generate a steering torque in a direction opposite to a braking torque generated in the vehicle; and
an electronic control unit (ECU) configured to control the EMB systems and the EPS system,
wherein the ECU is configured to control, upon determining that one or some of the plurality of EMB systems are malfunctioning, the vehicle by using the EPS system, and
the EPS system is configured to generate the steering torque according to the driving information including wheel speeds,
wherein the driving information detecting unit comprises: a plurality of wheel speed sensors,
wherein the EPS system is further configured to generate the steering torque by utilizing one or more normal wheel speed sensors when one or some of the plurality of wheel speed sensors are malfunctioning.

2. The apparatus of claim 1, wherein the ECU is configured to control, upon determining that all of EMB systems for braking left wheels among the plurality of wheels are malfunctioning, the EMB systems for braking right wheels among the plurality of wheels to generate a leftward steering torque.

3. The apparatus of claim 1, wherein the ECU is configured to control, upon determining that all of EMB systems for braking right wheels among the plurality of wheels are malfunctioning, the EMB systems for braking left wheels among the plurality of wheels to generate a rightward steering torque.

4. The apparatus of claim 1, wherein the ECU is configured to control, upon determining that any one of the EMB systems is malfunctioning against remaining normal EMB systems, the EPS system and the remaining normal EMB systems to control the vehicle not to spin.

5. The apparatus of claim 1, wherein the driving information detecting unit further comprises:
a steering angle sensor,
wherein the ECU is further configured to determine whether or not a spinning of the vehicle decreases by utilizing a steering angle detected by the steering angle sensor.

6. The apparatus of claim 5, wherein the ECU is configured to control, upon determining that the spinning of the vehicle does not decrease, the EPS system to additionally generate the steering torque.

7. A method of braking a vehicle, comprising:
determining whether at least one electro-mechanical braking (EMB) system is malfunctioning;
upon determining that the at least one EMB system is malfunctioning, generating wheel speed information by measuring wheel speeds by using one or more wheel speed sensors and transmitting the wheel speed information to an electronic power steering (EPS) system by using in-vehicle communications; and
generating a steering torque based on the wheel speed information for preventing the vehicle from spinning during braking by using the EPS system,
wherein the generating a steering torque comprises generating the steering torque by utilizing one or more normal wheel speed sensors when one or some of a plurality of wheel speed sensors of the vehicle are malfunctioning.

8. The method of claim 7, further comprising:
measuring a steering angle by using a steering angle sensor; and
determining whether to additionally generate the steering torque in the vehicle by using the steering angle.

9. An apparatus for braking a vehicle, comprising:
a plurality of electro-mechanical braking (EMB) systems respectively installed for a plurality of wheels of the vehicle and configured to generate a braking force to the plurality of wheels, respectively;
a driving information detecting unit configured to measure driving information of the vehicle;
an electronic power steering (EPS) system configured to generate a steering torque in a direction opposite to a braking torque generated in the vehicle; and
an electronic control unit (ECU) configured to control the EMB systems and the EPS system,
wherein the ECU is configured to control, upon determining that one or some of the plurality of EMB systems are malfunctioning, the vehicle by using the EPS system,
the EPS system is configured to generate the steering torque according to the driving information including wheel speeds, and
upon determining that more than one of EMB systems for braking right wheels or more than one of EMB systems for braking left wheels among the plurality of wheels are malfunctioning, the ECU is configured to control remaining EMB systems that are not malfunctioning to generate the steering torque in the direction opposite to the braking torque generated in the vehicle.

* * * * *